US006368436B1

(12) United States Patent
Canet et al.

(10) Patent No.: US 6,368,436 B1
(45) Date of Patent: Apr. 9, 2002

(54) METHOD OF MAKING TRANSFER SURFACE

(75) Inventors: Christine Canet, Thann; Jerzy Kuczyinski, Zillisheim; Gérard Rich, Orschwihr, all of (FR)

(73) Assignee: Rollins S.A., Cernay (FR)

( * ) Notice: Subject to any disclaimer, the term of this patent is extended or adjusted under 35 U.S.C. 154(b) by 0 days.

(21) Appl. No.: 09/465,762

(22) Filed: Dec. 17, 1999

Related U.S. Application Data

(62) Division of application No. 08/853,237, filed on May 9, 1997, now Pat. No. 6,027,289.

(30) Foreign Application Priority Data

May 10, 1996 (FR) ........................................... 96 05865
May 10, 1996 (FR) ........................................... 96 05865

(51) Int. Cl.[7] ............................................... B32B 31/16

(52) U.S. Cl. ................ 156/73.1; 156/272.2; 156/272.6; 156/274.4

(58) Field of Search ......................... 428/199; 29/121.1, 29/121.8, 132, 895, 895.32; 427/423; 156/73.1, 272.2, 272.4, 272.6

(56) References Cited

U.S. PATENT DOCUMENTS

| | | | | | |
|---|---|---|---|---|---|
| 4,287,827 | A | * | 9/1981 | Warner | 101/141 |
| 4,350,735 | A | | 9/1982 | Saitoh | 428/328 |
| 4,601,242 | A | * | 7/1986 | Fadner | 101/348 |
| 4,637,310 | A | * | 1/1987 | Sato et al. | 101/426 |
| 4,860,652 | A | | 8/1989 | Kawata | 101/348 |
| 4,879,791 | A | | 11/1989 | Herb | 29/148.4 |
| 5,099,759 | A | | 3/1992 | Sonobe et al. | 101/348 |
| 5,113,760 | A | | 5/1992 | Sonobe et al. | 101/348 |
| 5,188,030 | A | | 2/1993 | Puschnerat et al. | 101/348 |

FOREIGN PATENT DOCUMENTS

JP 1145147 9/1989

* cited by examiner

*Primary Examiner*—Merrick Dixon
(74) *Attorney, Agent, or Firm*—Leydig, Voit & Mayer, Ltd.

(57) ABSTRACT

A method of manufacturing a surface for the transfer of a viscous liquid product including photochemically grafting onto a surface in distinct zones at least one of anti-adherent hydrophilic monomers, anti-adherent hydrophobic monomers, anti-adherent hydrophilic oligomers, anti-adherent hydrophobic oligomers, and combinations of them, conferring upon the surface a heterogeneousness of structure improving the quality of the transfer of the viscous liquid product.

14 Claims, 2 Drawing Sheets

METHOD OF MAKING TRANSFER SURFACE

This disclosure is a divisional of patent application Ser. No. 08/853,237, filed on May 9, 1997, U.S. Pat. No. 6,232,227.

The subject matter of the present invention essentially relates to a surface for transferring a more or less viscous liquid product such, for example ink to any support whatsoever, for example, as paper.

It is also directed to a method of manufacturing such a surface.

It is further directed to a printing blanket provided with this surface and usable for example, in offset printing.

There has already been proposed a very great number of blanket structures for offset printing. As known, printing cylinders are generally covered or lined with such a blanket to allow printing upon a sheet of paper, for instance, and which receive the ink carried by a litho offset plate, itself carried by a cylinder or roll which has previously been covered with a film of ink and water.

The inconveniences and problems or difficulties encountered with these structures are the following.

At first, the transfer of ink upon the blanket of the printing cylinder is not -carried out in a precise manner. In other words, the transfer of the inked pattern, design or of the inked relief upon the blanket is not carried out in a faithful or accurate manner since the ink has the tendency to spread out over the blanket of the printing cylinder and to diffuse thereby seriously affecting the quality of the printing upon the paper. These defects are particularly marked in areas printed with screening, i.e., images consisting of points or printed areas separated from each other by non-printing zones. Moreover the transfer of ink upon the printing blanket is not regular so that a heterogeneousness may be seen in the tint areas, i.e., the printed zones consisting of a continuous film of ink, i.e., fully covering a certain surface.

Likewise, the blankets of the prior art do not provide a good cleaving, splitting, or separation of the ink-water pair transferred upon the printing blanket, thereby reflecting upon the printing made by the blanket upon the paper. In other words, the selectivity of the positioning of the ink and of the water upon the blanket is crucial if it is desired to obtain, on the paper, a printed image with an outstanding quality.

It should further be pointed out that when leaving the printing, i.e., at the level of the contact zone between the blanket-carrying cylinder and the underlying back pressure cylinder high cleaving forces are generated cause a bad release of the paper in view of too great a relative adherence between the ink and the surface of the blanket. Owing to this relatively substantial adherence, fibres may come off the paper sheet and thus be caused to gather upon the very blanket during the printing, gradually impairing the quality of printing.

SUMMARY OF THE INVENTION

The object of the invention is therefore, in particular, to remedy the inconveniences referred to hereinabove by proposing an improved transfer surface providing an outstanding quality of the image transferred upon the paper, a regular transfer of ink upon the blanket as regards the tint areas, a good ink-water cleaving on the surface of the blanket and an outstanding release of the paper when leaving the printing without any risk of accumulating or gathering paper fibres upon the blanket.

For that purpose, the subject of the invention is a surface of a more or less viscous liquid product upon a support to be covered such as paper for example, characterized in that it consists of a substrate upon which are grafted or inserted a plurality of distinct zones consisting either of zones from an anti-adhesive or anti-adherent material or of zones made from a hydrophilic material or of zones made from a hydrophobic material or of any combination of such zones to impart upon the said surface a heterogeneousness of structure to improve the quality of the transfer upon the support.

The aforesaid anti-adhesive or anti-adherent material is silicone, forming upon the substrate a plurality of zones, all of which represent from 5% to 95% of the surface area of the said substrate.

The hydrophilic material is a polymer of the kind, for example, with acid lateral groups forming on the substrate a plurality of zones, all of which represent from 5% to 95% of the surface area of the substrate.

The hydrophobic material is a non-polar or fluorine-containing, polymer forming on the substrate a plurality of zones, all of which represent from 5% to 95% of the surface area of the substrate.

According to an exemplary embodiment, the aforesaid transverse surface comprises a substrate on which are grafted or inserted zones of anti-adherent or anti-adhesive material representing from 5% to 50% of the surface area of the substrate, zones of hydrophilic material representing from 5% to 75% of the surface area of the substrate, and zones of hydrophobic material representing from 5% to 75% of the surface area of the said substrate.

Preferably the aforesaid zones of anti-adherent materials, of hydrophilic material, and of hydrophobic material represent from 5% to 10%, from 30% to 45% and from 50% to 60%, respectively, of the surface area of the substrate.

According to another characterizing feature of this transfer surface, the aforesaid zones have any geometrical shape providing a regular or random screening upon the substrate.

It should further be specified here that the surface area of insertion of each zone upon the aforesaid substrate ranges between about $10^{-7}$ $mm^2$ and about $10^{-2}$ $mm^2$.

According to still another characterizing feature of this invention, the aforesaid substrate itself is a hydrophilic or hydrophobic material, preferably of an elastomeric nature.

The invention is further directed to a method of manufacturing a surface for the transfer of a more or less viscous liquid product meeting either one of the characterizing features referred to hereinabove, this method being characterized in that it consists in photochemically grafting upon a substrate anti-adherent, hydrophilic or hydrophobic monomers or oligomers or any combination of such monomers or oligomers to provide upon the substrate distinct zones imparting upon the surface a heterogeneousness of structure capable of improving the quality of the transfer.

This method is further characterized in that the aforesaid zones are provided after coating of the monomers or oligomers upon the substrate, by irradiation of the latter through a mask comprising opaque and transparent portions.

The grafting of the aforesaid zones may be carried out by successive irradiations with different masks and in any order whatsoever.

It should further be specified here that the irradiation is performed for example, by means of an ultraviolet radiation and in the presence of at least one photo-initiator.

This invention is further directed to a printing blanket which comprises a transfer surface complying with the characterizing features referred to hereinabove or obtained by means of the method set forth hereinabove.

This blanket may present itself as a strip or web or as a sleeve adapted to be mounted onto a printing cylinder in a web-fed rotary offset printing machine for example.

The invention will be better understood and further objects, characterizing features, details and advantages thereof will appear better when reading the explanatory description which follows and refers to the accompanying diagrammatic drawings given by way of non limiting example only illustrating a presently preferred specific embodiment thereof and in which:

FIG. 1 is an elevational view in section through a transfer surface according to this invention and to an exemplary embodiment thereof;

FIGS. 2, 3, and 4 successively illustrate also in elevation and in section, the method of manufacturing such a transfer surface;

DETAILED DESCRIPTION

Figure 1:
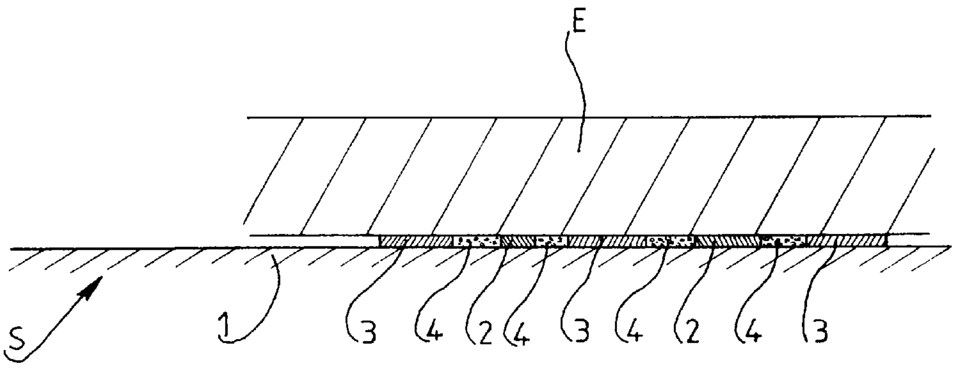

According to one exemplary embodiment and referring to FIG. 1, there is seen that a surface S for the transfer of a more or less viscous liquid product such as ink E for example, comprises according to the principles of the invention, a substrate 1 onto which are photochemically grafted a multiplicity of distinct zones, namely zones 2 of anti-adherent material, zones 3 of hydrophilic material and zones 4 of hydrophobic material, it being understood that the sizes of these zones have been much exaggerated on the Figure for the sake of clarity and of a better understanding.

The substrate 1, although to not shown, may perfectly comprise any one single type only or any two types of the three zones 2, 3, 4 referred to hereinabove without departing from the scope of the invention. This means that it is possible to graft upon the substrate 1 zones 2, 3, 4 of anti-adherent, hydrophilic and hydrophobic material according to any combination whatsoever of such zones, thereby conferring upon the transfer surface S some heterogeneousness of structure to improve the quality of the transfer of the ink E to, any support such as a sheet of paper or for example, visible at 5 on FIG. 6 and as described in detail subsequently.

The substrate 1 may be a conventional substrate such as usually utilized in the art of blankets, i.e., a substrate made from a nitrile-based elastomeric material which is ground-sandpapered or obtained by extrusion; the substrate may however, according to the invention, be also made from a hydrophilic or hydrophobic material, preferably from a hydrophilic or hydrophobic elastomeric material such as formulated polyolefin or polyurethane. The substrate 1 would have a thickness lying between about 0.05 mm and about 0.5 mm.

Figure 5:
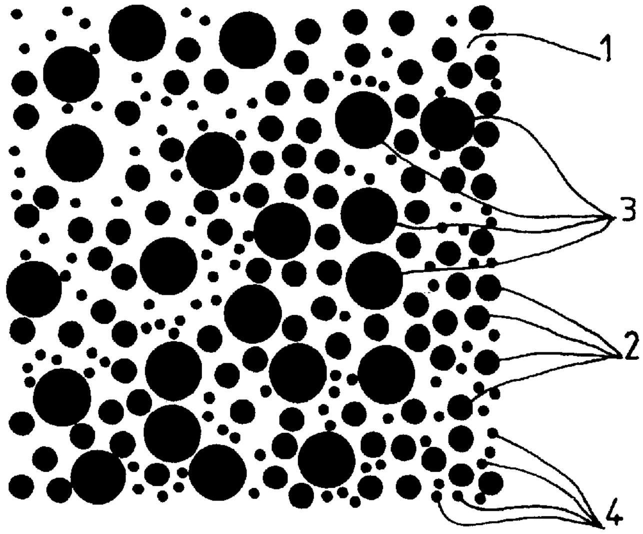
FIG. 5 is a plan view of this transfer surface.

Furthermore the zones consisting of the aforesaid various materials may have any geometrical shape whatsoever providing upon the surface of the substrate 1 a screening which may be regular or random. Thus in the case of a transfer surface S comprising the three kinds of zones 2, 3, 4, the screening may, for example be the one visible on FIG. 5 where it is seen that the zones of anti-adherent material 2, the zones of hydrophilic material 3, and the zones of hydrophobic material 4 exhibit substantially circular shapes with different dimensions. This is a random screening but which also could be a regular one, i.e., wherein all the zones would, for example have the same dimension with a constant spacing between these zones. The insertion of the zones 2, 3, 4 would be such that there could therefore be a communication therebetween, the degree of this communication being a function of the ratio of the surface area of the grafted zones to the surface area of the non-grafted substrate, i.e., a function of the rate of coverage desired for a given printing.

In this respect, it should be specified that the surface of insertion of each zone 2, 3 and/or 4 on the substrate 1 may lie between about $10^{-7}$ mm$^2$ and about $10^{-2}$ mm$^2$, the value adopted for this surface being, of course, a function of the desired quality of the transfer upon the support 5 and also of the nature of this support. The photo-grafted zones 2, 3, 4 would have a thickness lying between about 0.001 $\mu$m and about 10 $\mu$m.

The anti-adherent material forming the zones 2 on the substrate 1 is silicone. The hydrophilic material forming the zones 3 on the support 1 generally is a polymer of the type, for example with acid lateral groups. As to the hydrophobic material forming the zones 4 on the substrate 1, it would be constituted by a non-polar or fluorine-containing polymer.

The aforesaid zones made from a different material would represent from 5% to 95% of the surface area of the substrate 1.

Reverting to the particular embodiment visible in FIG. 1, the zones 2 of silicone-based material making the surface S anti-adherent are grafted upon the substrate 1 so as to constitute from 5% to 50% of the surface area of the substrate. The zones of hydrophilic material 3 may represent from 5% to 75% of the surface area of the substrate 1, and the zones 4 of hydrophobic material may represent from 5% to 75% of the surface area of the said substrate.

These three zones 2, 3, 4 of anti-adherent material, of hydrophilic material, and of hydrophobic material preferably represent from 5% to 10%, from 30% to 45% and from 50% to 60%, respectively, of the surface area of the substrate 1 and this in order to obtain a better compromise of the advantages set forth at the beginning of this description.

Now will be explained how the manufacture of the support S of FIG. 1, given by way of example only, is carried out with reference more particularly to FIGS. 2, 3 and 4.

Figure 2:
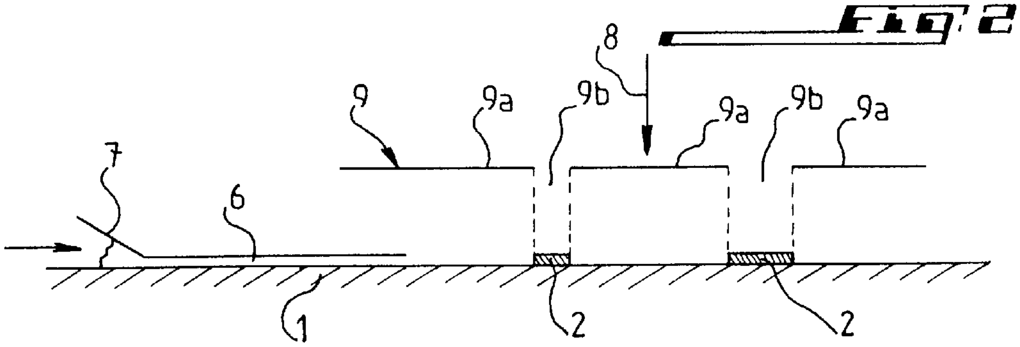

At first as seen on FIG. 2, a film 6 of silicone-based monomers is deposited and applied to the surface of the substrate 1 by means of a scraper or doctor blade diagrammatically designated at 7. The film 6 preferably comprises conventional photo-initiators and the substrate 1 may likewise comprise photo-initiators and integrated photosensitive places to facilitate the, carrying out of the grafting.

Then the substrate 1 coated with the film 6 is irradiated by high-energy ultraviolet radiation as physically shown by the arrow 8 through a first mask 9 comprising opaque portions 9*a* and transparent portions 9*b*. Thus the photo-grafting of the silicone-based monomers will occur only in the zones 2 exposed to the ultraviolet radiation. One could perfectly use for initiating the polymerization or the grafting, visible light, an electron beam, or even an X-ray instead of ultraviolet radiation without departing from the scope of the invention.

Figure 3:
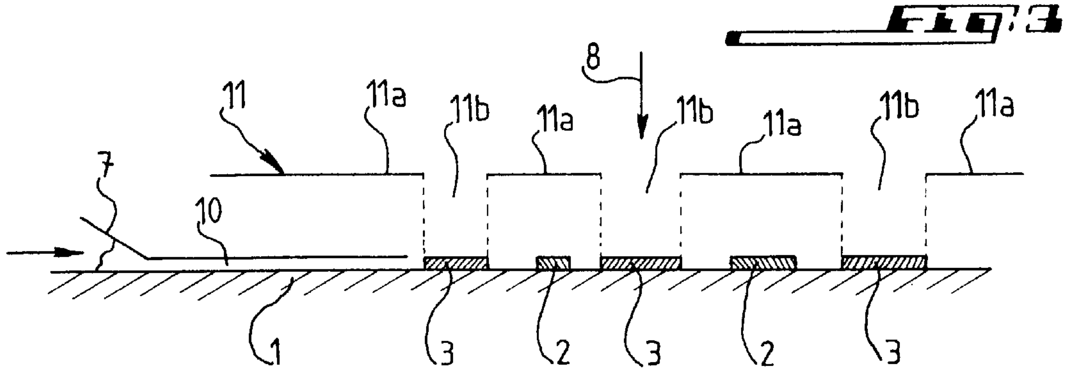

Then, as seen in FIG. 3, is deposited upon the substrate previously obtained and comprising the silicone zones 2. The film 10 is applied with the scraper or doctor blade 7 and which is a hydrophilic monomers-based film, for example containing acid functions or functional groups such as $NaSO_3$, COOH or OH. The film 10 would also comprise adequate photo-initiators. Then the surface of the substrate 1 would be exposed to the ultraviolet radiation through a second mask 11 so as to quickly obtain the polymerization of the monomers. This second mask 11 comprises opaque portions 11_a_ capable of preserving the previously grafted zones 2 of silicone material and transparent portions 11_b_ permitting polymerization of the monomers with acid groups to thus provide the zones 3 of hydrophilic material.

Figure 4:
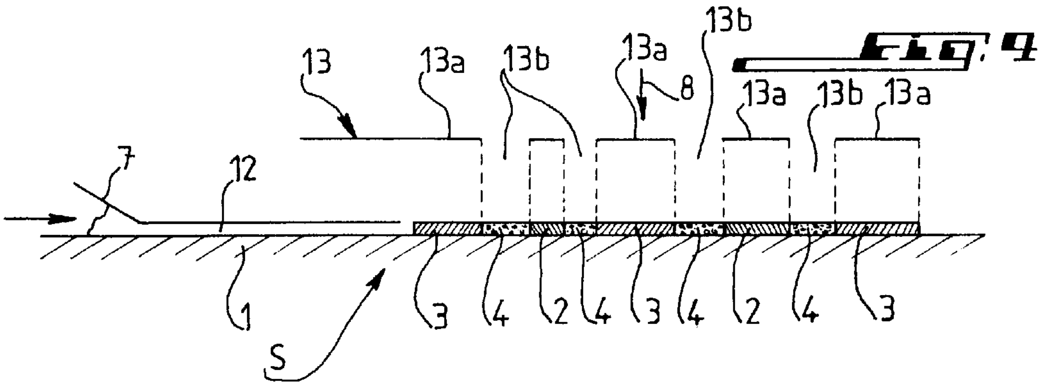

At last, to carry out the photo-grafting of the zones 4 of hydrophobic material, there is the process shown is FIG. 4. A film 12 of hydrophobic monomers is deposited and applied with the assistance of the scraper or doctor blade 7 upon the substrate 1 comprising, as previously explained anti-adherent zones 2 of silicone and zones 3 of hydrophilic material. The hydrophobic monomers, for example are non polar monomers such as alkane, olefin or fluorine-containing monomers with one or several acrylate or methacrylate functionalities, for example. The film 12 of monomers would also comprise suitable photo-initiators and would be irradiated by ultraviolet radiation 8 through a third mask 13 comprising opaque portions 13_a_ and transparent portions 13_b_ letting the grafting occur only in the zones exposed to ultraviolet radiation to thus obtain the zones 4 of hydrophilic material.

It should be pointed out here that between each film application 6, 10, 12, the surface of the substrate 1 is strongly washed to remove the monomer in the non-irradiated zones and to remove excesses of monomers in the irradiated zones. This operating step is necessary at the end of one grafting phase before starting the following grafting phase.

With this process has therefore been provided a surface S for the transfer of ink E, for example, to upon a paper web 5, which surface comprises three types of zones constituted by different materials but other alternative embodiments of the transfer surface S may be made within the scope of this method. Hereinafter are given some examples by way of illustration of the invention and which should not be considered as restricting the latter.

It is thus possible to make a surface S forming a printing blanket with a strong power or capacity of releasing. This blanket would comprise a substrate 1 of the conventional kind, i.e., consisting of a nitrile-based elastomer and which would be ground and sandpapered. Then by means of a mask, such as the mask 9 of FIG. 1, one would carry out the photo-grafting of a plurality of silicone zones with a stochastic screening and sizes of silicone zones communicating or non-communicating with each other, with surfaces of insertion ranging from $10^{-7}$ $mm^2$ to $10^{-2}$ $mm^2$ or with diameters of circular zones ranging from 0.2 micron to 100 microns. As previously explained, these zones or points of silicone may represent from 5% to 95% of the surface area of the substrate 1 which therefore would here only comprise zones of silicone-based material making the said surface strongly anti-adherent.

According to another example, the substrate 1 could itself be made from a hydrophobic material upon which would be grafted zones such as zones 3 of hydrophilic material. More specifically, the substrate would be made from a polyolefinic elastomer and the zones 3 would form any screening pattern or design whatsoever, the size of these zones or points, as well as the percentage of coverage of the substrate 1 having the values stated hereinabove. In this case, the transfer surface S would therefore only comprise hydrophilic zones or points 3 made with a mask such as the mask 11 visible in FIG. 3.

It is also possible to manufacture a transfer surface S comprising, contrary to the foregoing transfer surface, a hydrophilic substrate 1 including hydrophobic zones or points 4. The substrate could here be in a typical manner a carboxylated nitrile-based elastomer. The hydrophobic zones such as the zones 4 visible in FIG. 4 could be obtained through a mask such as 13 by photo-grafting of alkane or olefinic monomers to form a regular or random screening with the values previously stated for the size of the hydrophobic zones or spots 4 and as regards the percentage of coverage of the substrate 1 by these zones.

The examples of transfer surface S according to the invention are not limiting.

Reverting to the particular transfer surface S visible in FIG. 1, it should be pointed out that the order of the grafting of the various types of zones could be different from the one successively illustrated by FIGS. 2, 3 and 4.

The transfer surface S according to this invention with its different zones made from different materials which have just been described will exhibit a heterogeneousness of structure improving the quality of transfer of the ink E upon a paper sheet 5 for example.

Figure 6:
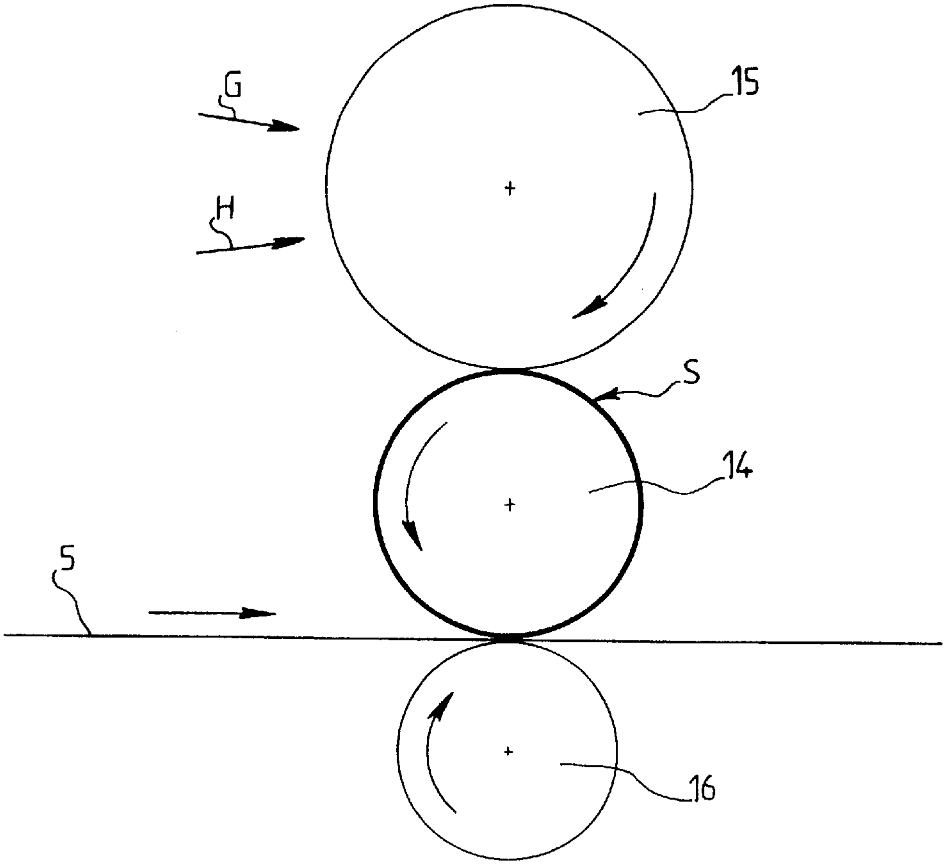
FIG. 6 is a diagrammatic elevational view of one part of an offset printing unit using a printing cylinder carrying a blanket consisting of the transfer surface according to this invention.

As seen on FIG. 6, the printing surface S comprising the substrate with the photo-grafted zones forms the lithographic layer of a blanket or of a sleeve which also comprise at least one compressible layer and a reinforcing layer (which are not shown) and which is mounted on an offset printing cylinder 14. There has further been shown in FIG. 6 a litho offset plate-carrying cylinder 15 receiving water and ink as physically shown by the arrows G and H, respectively, E transferred upon the printing cylinder 14 under the effect of the rotation, which cylinder 14 would carry out the printing upon the paper sheet S held by a back-pressure cylinder 16. This cylinder 16 could also be a printing cylinder like the cylinder 14 in order to carry out printing upon both faces or sides of the paper sheet 5.

The printing upon the sheet 5 will have an outstanding quality owing to the screening with different materials as previously explained. More specifically the anti-adherent silicone-based zones 2 according to their sizes, their distribution, the surface area they are covering with respect to the surface area of the substrate 1 upon which they are inserted, etc. will permit a release of the water and of the ink upon the paper 5 which will be suitable and such that a precise and regular printing will be obtained without any risk of fattening or of overshooting the pattern or design to be printed, carried by the cylinder 14.

As to the hydrophilic zones 2 on the substrate 1, they will permit a suitable attraction of water and ink from the cylinder 15 upon the printing cylinder 14 carrying the blanket-forming surface S whereas the hydrophobic zones 4 would contribute to improve the distribution of water upon the said blanket outside of those zones so as to provide a suitable water-ink cleaving improving separation of the images and therefore the quality of printing upon the paper sheet 5. Moreover the transfer surface according to this invention would avoid, as explained at the beginning of this description, a bad release at the exit of the paper in the gap or nip between the cylinders 14 and 16, i.e., would substantially reduce the forces of cleaving of the film of ink. Furthermore the surface or blanket according to this invention will not any defect of homogeneousness of the tint areas appear during printing in particular, because there is no accumulation or gathering of paper fibres and of ink upon the blanket and because the cleaving of the film of ink is facilitated by the heterogeneous surface.

The invention is, of course, not at all limited to the embodiments described and illustrated which have been given by way of examples only.

Indeed the selection of the nature, of the number, of the distribution and/or of the size of the photochemically grafted zones or points or spots on the substrate will permit to obtain a transfer surface having the desired surface morphology to provide a surface for the transfer of ink or other product such as, for example, wetting varnish or an additive upon any support whatsoever, such as paper with all the qualities required and desired for the transfer to, in accordance, in particular, with the nature of the support receiving the printing and of the type of patterns or designs to be printed. Although the invention has been described as being essentially applicable to printing blankets, it should also be considered as encompassing all the transfer surfaces mounted upon the cylinders of any printing, varnishing or coating machines.

The invention therefore comprises all the technical equivalents of the means described as well as their combinations if the latter are carried out according to its gist and within the scope of the appended claims.

What is claimed is:

1. A method of manufacturing a transfer surface for the transfer of a viscous liquid product to a support, the process comprising photochemically grafting onto a transfer surface in a plurality of distinct zones at least one selected from the group consisting of anti-adherent monomers, hydrophilic monomers, hydrophobic monomers, anti-adherent oligomers, hydrophilic oligomers, hydrophobic oligomers, thereby conferring upon the transfer surface a heterogeneous structure including at least one of anti-adherent zones, hydrophilic zones, and hydrophobic zones, improving the quality of the transfer of the viscous liquid product from the transfer surface.

2. The method according to claim 1, including producing the zones, after applying the monomers and/or oligomers to the transfer surface, by irradiation of the transfer surface through a mask having opaque portions and transparent portions.

3. The method according to claim 2, including effecting the irradiation with ultraviolet radiation in the presence of at least one photoinitiator.

4. A printing blanket including a transfer surface prepared according to claim 2.

5. A printing blanket including a transfer surface prepared according to claim 3.

6. A printing blanket including a transfer surface prepared according to claims 1.

7. The printing blanket according to claim 6, in the form of a strip or a sleeve mountable on an offset printing cylinder.

8. The method according to claim 1, including photochemically grafting onto the transfer surface in a plurality of distinct zones at least two selected from the group consisting of anti-adherent monomers, hydrophilic monomers, hydrophobic monomers, anti-adherent oligomers, hydrophilic oligomers, hydrophobic oligomers, thereby conferring upon the transfer surface a heterogeneous structure including at least two of anti-adherent zones, hydrophilic zones, and hydrophobic zones, improving the quality of the transfer of the viscous liquid product from the transfer surface.

9. The method according to claim 8, including grafting of the zones by respective and successive irradiation using different masks.

10. The method according to claim 9, including effecting the irradiation with ultraviolet radiation in the presence of at least one photoinitiator.

11. A printing blanket including a transfer surface prepared according to claim 9.

12. The method according to claim 1, including photochemically grafting onto the transfer surface in a plurality of distinct zones at least three selected from the group consisting of anti-adherent monomers, hydrophilic monomers, hydrophobic monomers, anti-adherent oligomers, hydrophilic oligomers, hydrophobic oligomers, thereby conferring upon the transfer surface a heterogeneous structure including anti-adherent zones, hydrophilic zones, and hydrophobic zones, improving the quality of the transfer of the viscous liquid product from the transfer surface.

13. The method according to claim 12, including grafting of the zones by respective and successive irradiation using different masks.

14. The method according to claim 13, including effecting the irradiation with ultraviolet radiation in the presence of at least one photoinitiator.

* * * * *